A. V. CLELAND.
Corn-Shellers.

No. 151,474.  Patented June 2, 1874.

Witnesses.  Inventor:

UNITED STATES PATENT OFFICE.

A. VINCENT CLELAND, OF NILES, MICHIGAN.

IMPROVEMENT IN CORN-SHELLERS.

Specification forming part of Letters Patent No. 151,474, dated June 2, 1874; application filed February 14, 1874.

*To all whom it may concern:*

Be it known that I, A. VINCENT CLELAND, of Niles, in the county of Berrien and State of Michigan, have invented a new and useful Improvement in Corn-Shellers, of which the following is a specification:

The nature of the invention relates to the construction and arrangement of the driving-gear, which are arranged on parallel shafts, and the shape of the faces of the two gears so constructed that the shafts may be thrown out of parallel without materially disturbing the mesh of the teeth.

Figure 1:
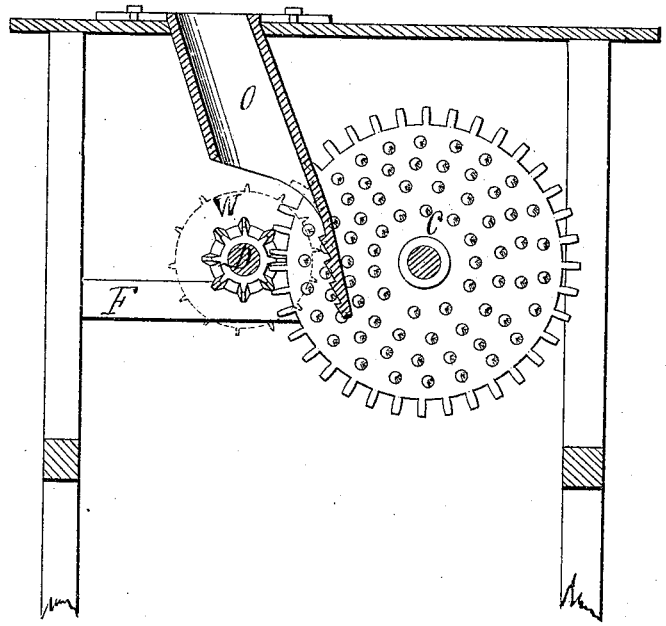
Figure 2:
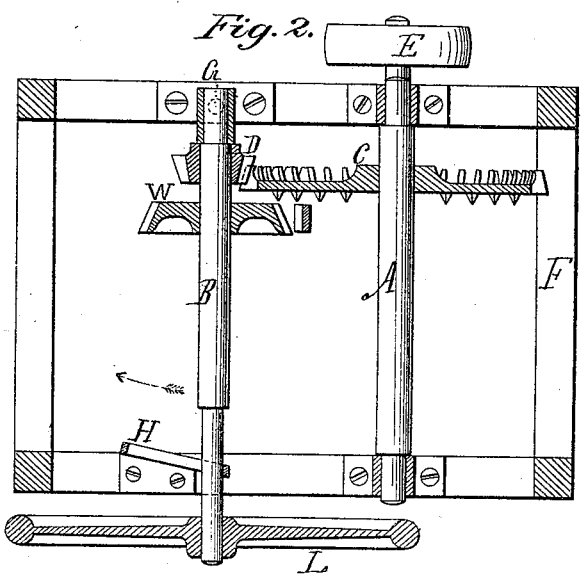

In the accompanying drawing, which forms a part of this specification, Figure 1 represents a vertical longitudinal section through the hopper and frame of a corn-sheller embodying my invention. Fig. 2 is a horizontal section through the shelling-wheels and driving-gear of the same.

The same letters refer to corresponding parts.

F is the frame of the machine, upon which are supported the parallel shafts A and B. The shaft A is driven from the pulley E, and revolves in bearings fixed on the frame. The shaft B is supported at one end in the pivoted bearing G, and at the other end in the inclined slotted bearing H. Near one end of the shafts A and B are located the bevel-wheels C and D, which engage with each other, and the bevel-faces of which are inclined in opposite directions, so that if the shaft B is thrown out of parallel with the shaft A, by moving its loose end in the slotted inclined bearing H, the teeth of the wheels will not be withdrawn from their full depth of contact with each other, which would be the case if common spur-gears were used. In order that the gears may mesh accurately, the form of their faces and of the ends of the teeth should be determined by describing a circle whose center is the center of the pivoted bearing G of the shaft B, and whose radius reaches the point of contact between the wheels C and D, reference being had to the size of wheel D in determining the distance from the center of bearing G. By making the gears as described, greater width of teeth may be employed on a wheel of given thickness, and greater lateral displacement may be produced without disengaging the teeth. These beveled wheels are set slightly out of line with each other, so that when the lateral displacement takes place, the larger diameter of the wheel D will be thrown in contact with the teeth of the wheel C, thus compensating for the increase of space between the shafts A and B, and preserving a nearly perfect contact of the teeth of the two wheels. One side of the wheel C is provided with spurs to act in conjunction with the shelling-wheel W on the shaft B, to the movable end of which is attached the fly-wheel L.

The ears of corn to be shelled are fed into the hopper O, and pass between the faces of the wheels C and W. The shaft B yields at one end to suit the varying sizes of the ears, and the weight of the fly-wheel tends constantly to return the shaft B to its parallel position.

I am aware that the slotted inclined bearing H and pivoted bearing G are old devices, and I do not claim them independently of the connection shown; but

What I claim, and desire to secure by Letters Patent, is—

The combination of the frame F, shafts A and B, sheller-wheel W, reversely-beveled wheels C and D, inclined slotted bearing H, and pivoted bearing G, substantially as and for the purpose set forth.

A. VINCENT CLELAND.

Witnesses:
  M. F. CLELAND,
  S. H. WHEELER.